(12) United States Patent
Yabu et al.

(10) Patent No.: US 7,997,098 B2
(45) Date of Patent: Aug. 16, 2011

(54) ADSORPTION HEAT EXCHANGER WITH VARYING ADSORBENT

(75) Inventors: Tomohiro Yabu, Osaka (JP); Shuji Ikegami, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 611 days.

(21) Appl. No.: 11/587,677

(22) PCT Filed: Apr. 25, 2005

(86) PCT No.: PCT/JP2005/007844
§ 371 (c)(1),
(2), (4) Date: Oct. 26, 2006

(87) PCT Pub. No.: WO2005/106340
PCT Pub. Date: Nov. 10, 2005

(65) Prior Publication Data
US 2007/0240864 A1 Oct. 18, 2007

(30) Foreign Application Priority Data
Apr. 28, 2004 (JP) ................................. 2004-132470

(51) Int. Cl.
*F25D 23/00* (2006.01)
(52) U.S. Cl. .................................. 62/271; 62/94; 252/69
(58) Field of Classification Search .................... 62/271, 62/94; 252/69
See application file for complete search history.

(56) References Cited

U.S. PATENT DOCUMENTS

| 2003/0083193 A1* | 5/2003 | Takaya et al. .................. 502/304 |
| 2004/0231828 A1* | 11/2004 | Dunne et al. .................. 165/104.12 |

FOREIGN PATENT DOCUMENTS

| JP | 05-508802 A | 12/1993 |
| JP | 07-265649 A | 10/1995 |
| JP | 08-084929 A | 4/1996 |
| JP | 08084929 A * | 4/1996 |
| JP | 10-286460 * | 10/1998 |
| JP | 2003-093831 A | 4/2003 |
| JP | 2003-117333 A | 4/2003 |
| JP | 2003161465 A * | 6/2003 |
| WO | WO 91/16964 A1 | 11/1991 |
| WO | WO 9116964 A1 * | 11/1991 |

OTHER PUBLICATIONS

Machine translation of JP Publication No. 10-286460.*

* cited by examiner

*Primary Examiner* — Cheryl J Tyler
*Assistant Examiner* — Jonathan Koagel
(74) *Attorney, Agent, or Firm* — Birch, Stewart, Kolasch & Birch, LLP.

(57) ABSTRACT

An adsorption heat exchanger (20) is constituted by a fin-and-tube heat exchanger. In the adsorption heat exchanger (20), a first tube column (41), a second tube column (42) and a third tube column (43) are formed in order from upstream to downstream in air flow. The adsorption heat exchanger (20) is formed of a first column part (21) including the first tube column (41), a second column part (22) including the second tube column (42) and a third column part (23) including the third tube column (43). In the adsorption heat exchanger (20), a first adsorption layer (36) is formed on the fins (30) in the first column part (21), a second adsorption layer (37) is formed on the fins (30) in the second column part (22) and a third adsorption layer (38) is formed on the fins (30) in the third column part (23). The amount of adsorbent contained in each adsorption layer increases in order of the first adsorption layer (36), the second adsorption layer (37) and the third adsorption layer (38).

1 Claim, 8 Drawing Sheets

ADSORPTION HEAT EXCHANGER WITH VARYING ADSORBENT

TECHNICAL FIELD

This invention relates to adsorption heat exchangers for bringing air passing therethrough into contact with an adsorbent carried on the surfaces of their fins.

BACKGROUND ART

An adsorption heat exchanger is hitherto known which has an adsorbent carried on the surfaces of its fins and heat exchanger tube, as disclosed in Patent Document 1. This Patent Document 1 also discloses a dehumidifier using two adsorption heat exchangers. The dehumidifier supplies cooling water cooled in a cooling tower to the adsorption heat exchanger in adsorption phase and supplies hot water from a hot heat source to the other adsorption heat exchanger in regeneration phase. The dehumidifier alternately repeats a mode in which the first adsorption heat exchanger is in adsorption phase and the second adsorption heat exchanger is in regeneration phase and a mode in which the first adsorption heat exchanger is in regeneration phase and the second adsorption heat exchanger is in adsorption phase. Thus, the dehumidifier dehumidifies air in the adsorption heat exchanger in adsorption phase and regenerates the adsorbent in the adsorption heat exchanger in regeneration phase.

The behavior of the dehumidifier is described taking as an example a state where cooling water is supplied to the first adsorption heat exchanger and hot water is supplied to the second adsorption heat exchanger. The air passing through the first adsorption heat exchanger passes moisture to the adsorbent in the course of passage through between the fins and is thereby dehumidified. The cooling water flowing through the heat exchange tube of the first adsorption heat exchanger takes heat of adsorption produced when moisture in the air is adsorbed on the adsorbent. On the other hand, in the second adsorption heat exchanger, the hot water flowing through the heat exchange tube heats the adsorbent and the air passing through between the fins. Further, in the second adsorption heat exchanger, moisture is desorbed from the adsorbent and the desorbed moisture is applied to the air passing through between the fins.

Patent Document 1: Published Japanese Patent Application No. H07-265649

DISCLOSURE OF THE INVENTION

Problems to be Solved by the Invention

As described above, moisture is gradually taken from the air supplied to the adsorption heat exchanger in adsorption phase in the course of passage of the air through between the fins. In other words, the air passing through the adsorption heat exchanger in adsorption phase gradually decreases the absolute humidity in the course of passage through between the fins, which is accompanied by gradually decrease in relative humidity. Generally, as the air relative humidity decreases, moisture in the air is less likely to be adsorbed on the adsorbent. Therefore, in conventional adsorption heat exchangers, a smaller amount of moisture is adsorbed on their parts located downstream in the air flow than on their parts located upstream in the air flow. Furthermore, such offset of the amount of moisture adsorbed in the same adsorption heat exchanger causes a problem that the adsorption heat exchanger cannot exhibit its moisture adsorption capacity well.

The present invention has been made in view of the above points and, therefore, its object is to allow an adsorption heat exchanger to exhibit the moisture adsorption capacity well.

Means to Solve the Problems

A first solution of the present invention is directed to an adsorption heat exchanger including a heat exchange tube (40) through which heat medium circulates and fins (30) on the surfaces of which an adsorbent is carried, said adsorption heat exchanger for bringing air passing therethrough into contact with the adsorbent carried on the fins (30). Further, a part of said adsorption heat exchanger located upstream in air flow constitutes an upstream part (26) and a part of said adsorption heat exchanger located downstream in the air flow constitutes a downstream part (27), and said adsorption heat exchanger is configured to uniform the amount of moisture adsorbed on the fins (30) from the upstream part (26) to the downstream part (27).

A second solution of the present invention is directed to the first solution, wherein an adsorption layer (36, 38) containing the adsorbent is formed on the surfaces of the fins (30), and the static capacity of the adsorption layer (36, 38) is different between the upstream part (26) and the downstream part (27), thereby uniforming the amount of moisture adsorbed on the fins (30) from the upstream part (26) to the downstream part (27).

A third solution of the present invention is directed to the first solution, wherein the amount of the adsorbent carried on the fins (30) is different between the upstream part (26) and the downstream part (27), thereby uniforming the amount of moisture adsorbed on the fins (30) from the upstream part (26) to the downstream part (27).

A fourth solution of the present invention is directed to the first solution, wherein an adsorption layer (36, 38) made of a mixture of adsorbent and binder is formed on the surfaces of the fins (30), and the mass contents of adsorbent and binder in the adsorption layer (36, 38) are different between the upstream part (26) and the downstream part (27), thereby uniforming the amount of moisture adsorbed on the fins (30) from the upstream part (26) to the downstream part (27).

A fifth solution of the present invention is directed to the first solution, wherein the upstream part (26) and the downstream part (27) have different substances carried as said adsorbents on the fins (30), thereby uniforming the amount of moisture adsorbed on the fins (30) from the upstream part (26) to the downstream part (27).

A sixth solution of the present invention is directed to an adsorption heat exchanger including a heat exchange tube (40) through which heat medium circulates and fins (30) which is attached to the heat exchange tube (40) and on the surfaces of which an adsorbent is carried, said adsorption heat exchanger for bringing air passing therethrough into contact with the adsorbent carried on the fins (30). Further, a part of said adsorption heat exchanger located upstream in air flow constitutes an upstream part (26) and a part of said adsorption heat exchanger located downstream in the air flow constitutes a downstream part (27), an adsorption layer (36, 38) containing the adsorbent is formed on the surfaces of the fins (30), and the downstream part (27) has a higher static capacity of the adsorption layer (36, 38) than the upstream part (26).

A seventh solution of the present invention is directed to an adsorption heat exchanger including a heat exchange tube (40) through which heat medium circulates and fins (30)

which is attached to the heat exchange tube (40) and on the surfaces of which an adsorbent is carried, said adsorption heat exchanger for bringing air passing therethrough into contact with the adsorbent carried on the fins (30). Further, a part of said adsorption heat exchanger located upstream in air flow constitutes an upstream part (26) and a part of said adsorption heat exchanger located downstream in the air flow constitutes a downstream part (27), and the downstream part (27) has a larger amount of the adsorbent carried on the fins (30) than the upstream part (26).

An eighth solution of the present invention is directed to an adsorption heat exchanger including a heat exchange tube (40) through which heat medium circulates and fins (30) which is attached to the heat exchange tube (40) and on the surfaces of which an adsorbent is carried, said adsorption heat exchanger for bringing air passing therethrough into contact with the adsorbent carried on the fins (30). Further, a part of said adsorption heat exchanger located upstream in air flow constitutes an upstream part (26) and a part of said adsorption heat exchanger located downstream in the air flow constitutes a downstream part (27), an adsorption layer (36, 38) made of a mixture of adsorbent and binder is formed on the surfaces of the fins (30), and the downstream part (27) has a higher mass content of adsorbent in the adsorption layer (36, 38) than the upstream part (26).

A ninth solution of the present invention is directed to an adsorption heat exchanger including a heat exchange tube (40) through which heat medium circulates and fins (30) which is attached to the heat exchange tube (40) and on the surfaces of which an adsorbent is carried, said adsorption heat exchanger for bringing air passing therethrough into contact with the adsorbent carried on the fins (30). Further, a part of said adsorption heat exchanger located upstream in air flow constitutes an upstream part (26) and a part of said adsorption heat exchanger located downstream in the air flow constitutes a downstream part (27), and the downstream part (27) has an adsorbent of higher static capacity carried as said adsorbent on the fins (30) than the upstream part (26).

-Operations-

In each of the above solutions, the adsorption heat exchanger (20) is provided with a heat exchange tube (40) and fins (30). An adsorbent is carried on the surfaces of the fins (30). The adsorbent on the surfaces of the fins (30) comes into contact with air passing through the adsorption heat exchanger (20). In the adsorption heat exchanger (20), the adsorbent may be carried only on the surfaces of the fins (30) or may be carried, for example, on the surfaces of the fins (30) and the surface of the heat exchange tube (40). In the adsorption heat exchanger (20), a part thereof located upstream in the air flow constitutes an upstream part (26) and a part thereof located downstream in the air flow constitutes a downstream part (27). The air passing through the adsorption heat exchanger (20) first comes into contact with the adsorbent on the surfaces of the fins (30) in the upstream part (26) and then comes into contact with the adsorbent on the surfaces of the fins (30) in the downstream part (27).

In the first solution, the adsorption heat exchanger (20) is configured to uniform the amount of moisture adsorbed on the fins (30) from the upstream part (26) to the downstream part (27). Thus, the adsorption heat exchanger (20) provides a uniform amount of moisture adsorbed on the fins (30) in every part from the upstream part (26) to the downstream part (27).

In the second solution, an adsorption layer (36, 38) is formed on the surfaces of the fins (30). The adsorption layer (36, 38) contains an adsorbent. In the adsorption heat exchanger (20), the static capacity of the adsorption layer (36, 38) is different between the upstream part (26) and the downstream part (27). If the adsorption layer (36, 38) has a different static capacity, this causes a different amount of moisture adsorbed on the adsorption layer (36, 38). Therefore, if the adsorption layer (36, 38) is changed in static capacity with changes in air condition in the course of air passage through the adsorption heat exchanger (20), this provides a uniform amount of moisture adsorbed on the fins (30) in every part from the upstream part (26) to the downstream part (27).

Note that the static capacity of the adsorption layer (36, 38) is expressed by the amount of moisture that the adsorption layer (36, 38) can adsorb when the fins (30) having the adsorption layer (36, 38) formed thereon are brought into contact with air of constant relative humidity for a sufficiently long time, i.e., the amount of moisture that the adsorption layer (36, 38) has adsorbed until equilibrium is reached under conditions of coexistence of the adsorption layer (36, 38) and air of constant relative humidity.

In the third solution, the amount of adsorbent carried on the fins (30) is different between the upstream part (26) and the downstream part (27). Different amounts of adsorbent carried on the fins (30) cause different amounts of moisture adsorbed on the fins (30). Therefore, if the amount of adsorbent carried on the fins (30) is changed with changes in air condition in the course of air passage through the adsorption heat exchanger (20), this provides a uniform amount of moisture adsorbed on the fins (30) in every part from the upstream part (26) to the downstream part (27).

In the fourth solution, an adsorption layer (36, 38) is formed on the surfaces of the fins (30). The adsorption layer (36, 38) is made of a mixture of adsorbent and binder. In the adsorption layer (36, 38), adsorbent particles are bound to each other by the binder. Therefore, the adsorbent particles in the adsorption layer (36, 38) have their surfaces partly covered with the binder. If the adsorption layer (36, 38) has different mass contents of the adsorbent and binder, this changes the area of part of the surface of each adsorbent particle capable of contact with air without being covered with the binder and, in turn, changes the amount of moisture adsorbed on the adsorption layer (36, 38). Therefore, in the adsorption heat exchanger (20), the mass contents of the adsorbent and binder in the adsorption layer (36, 38) are made different between the upstream part (26) and the downstream part (27), thereby providing a uniform amount of moisture adsorbed on the fins (30) in every part from the upstream part (26) to the downstream part (27).

In the fifth solution, the upstream part (26) and the downstream part (27) have different substances carried as adsorbents on the fins (30). Different substances carried as adsorbents on the fins (30) cause different amounts of moisture adsorbed on the fins (30). Therefore, if the substance carried on the fins (30) is selected according to changes in air condition in the course of air passage through the adsorption heat exchanger (20), this provides a uniform amount of moisture adsorbed on the fins (30) in every part from the upstream part (26) to the downstream part (27).

In the sixth solution, an adsorption layer (36, 38) is formed on the surfaces of the fins (30). The adsorption layer (36, 38) contains an adsorbent. In the adsorption heat exchanger (20), the downstream part (27) has a higher static capacity of the adsorption layer (36, 38) than the upstream part (26). Generally, when moisture in the air is adsorbed on the adsorption heat exchanger (20), moisture in the air gradually decreases in the course of air passage through the adsorption heat exchanger (20) and thereby becomes gradually less likely to be adsorbed on the adsorption layer (36, 38). In contrast, the adsorption heat exchanger (20) of this solution has a higher static capacity of the adsorption layer (36, 38) in its part downstream in air flow than in its part upstream in air flow. In the downstream part (27) which is located downstream in air flow and in which the adsorption layer (36, 38) is less likely to adsorb moisture in the air, an appropriate amount of moisture adsorbed can be ensured by forming an adsorption layer (36, 38) of relatively high static capacity on the fins (30). In addition, the adsorption heat exchanger (20) provides a uniform amount of moisture adsorbed on the fins (30) in every part from the upstream part (26) to the downstream part (27). Note that the meaning of the static capacity of the adsorption layer (36, 38) is as described above.

In the seventh solution, the downstream part (27) has a larger amount of adsorbent carried on the fins (30) than the upstream part (26). Generally, when moisture in the air is adsorbed on the adsorption heat exchanger (20), moisture in the air gradually decreases in the course of air passage through the adsorption heat exchanger (20) and thereby becomes gradually less likely to be adsorbed on the adsorption layer (36, 38). In contrast, the adsorption heat exchanger (20) of this solution has a larger amount of adsorbent carried on the fins (30) in its part downstream in air flow than in its part upstream in air flow. In the downstream part (27) which is located downstream in air flow and in which the adsorption layer (36, 38) is less likely to adsorb moisture in the air, an appropriate amount of moisture adsorbed can be ensured by carrying a relatively large amount of adsorbent on the fins (30). In addition, the adsorption heat exchanger (20) provides a uniform amount of moisture adsorbed on the fins (30) in every part from the upstream part (26) to the downstream part (27).

In the eighth solution, an adsorption layer (36, 38) is formed on the surfaces of the fins (30). The adsorption layer (36, 38) is made of a mixture of adsorbent and binder. In the adsorption layer (36, 38), adsorbent particles are bound to each other by the binder. Therefore, the adsorbent particles in the adsorption layer (36, 38) have their surfaces partly covered with the binder. If the mass content of adsorbent in the adsorption layer (36, 38) increases, this increases the area of part of the surface of each adsorbent particle capable of contact with air without being covered with the binder and, in turn, increases the amount of moisture adsorbed on the adsorption layer (36, 38). Therefore, the adsorption heat exchanger (20) is configured so that the downstream part (27) has a larger mass content of adsorbent in the adsorption layer (36, 38) than the upstream part (26). Thus, in the downstream part (27) which is located downstream in air flow and in which the adsorption layer (36, 38) is less likely to adsorb moisture in the air, an appropriate amount of moisture adsorbed can be ensured by increasing the area of part of the surface of each adsorbent particle capable of contact with air. In addition, the adsorption heat exchanger (20) provides a uniform amount of moisture adsorbed on the fins (30) in every part from the upstream part (26) to the downstream part (27).

In the ninth solution, the downstream part (27) has an adsorbent of higher static capacity carried on the fins (30) than the upstream part. In the adsorption heat exchanger (20) of this solution, the static capacity of adsorbent carried on the fins (30) is higher in the downstream part (27) than in the upstream part (26). In the downstream part (27) which is located downstream in air flow and in which the adsorption layer (36, 38) is less likely to adsorb moisture in the air, an appropriate amount of moisture adsorbed can be ensured by carrying on the fins (30) an adsorbent capable of adsorbing moisture well even if the air relative humidity is low. In addition, the adsorption heat exchanger (20) provides a uniform amount of moisture adsorbed on the fins (30) in every part from the upstream part (26) to the downstream part (27).

Note that the static capacity of the adsorbent is expressed by the amount of moisture that the adsorbent can adsorb when brought into contact with air of constant relative humidity for a sufficiently long time, i.e., the amount of moisture that the adsorbent has adsorbed until equilibrium is reached under conditions of coexistence of the adsorbent and air of constant relative humidity.

Effects of the Invention

As described above, the adsorption heat exchanger (20) of each of the above solutions provides a uniform amount of moisture adsorbed on the fins (30) in every part from the upstream part (26) to the downstream part (27). Therefore, even in the downstream part (27) of the adsorption heat exchanger (20) in which the amount of moisture adsorbed on the adsorbent would conventionally decrease, the amount of moisture adsorbed can be ensured substantially as much as in the upstream part (26). Consequently, according to each of the above solutions of the present invention, the amount of moisture adsorbed can be uniform in every part of the adsorption heat exchanger (20), thereby enhancing the moisture adsorption capacity of the adsorption heat exchanger (20).

EXPLANATION OF REFERENCE NUMERALS

20 adsorption heat exchanger
26 upstream part
27 downstream part
30 fin
36 first adsorption layer
37 second adsorption layer
38 third adsorption layer
40 heat exchange tube

BEST MODE FOR CARRYING OUT THE INVENTION

Embodiments of the present invention will be described below in detail with reference to the drawings.

Embodiment 1 of the Invention

A description is given of Embodiment 1 of the present invention. A humidity control system according to this embodiment is configured to be capable of carrying out a dehumidification operation for supplying dehumidified air to a room and a humidification operation for supplying humidified air to the room.

Figure 1:
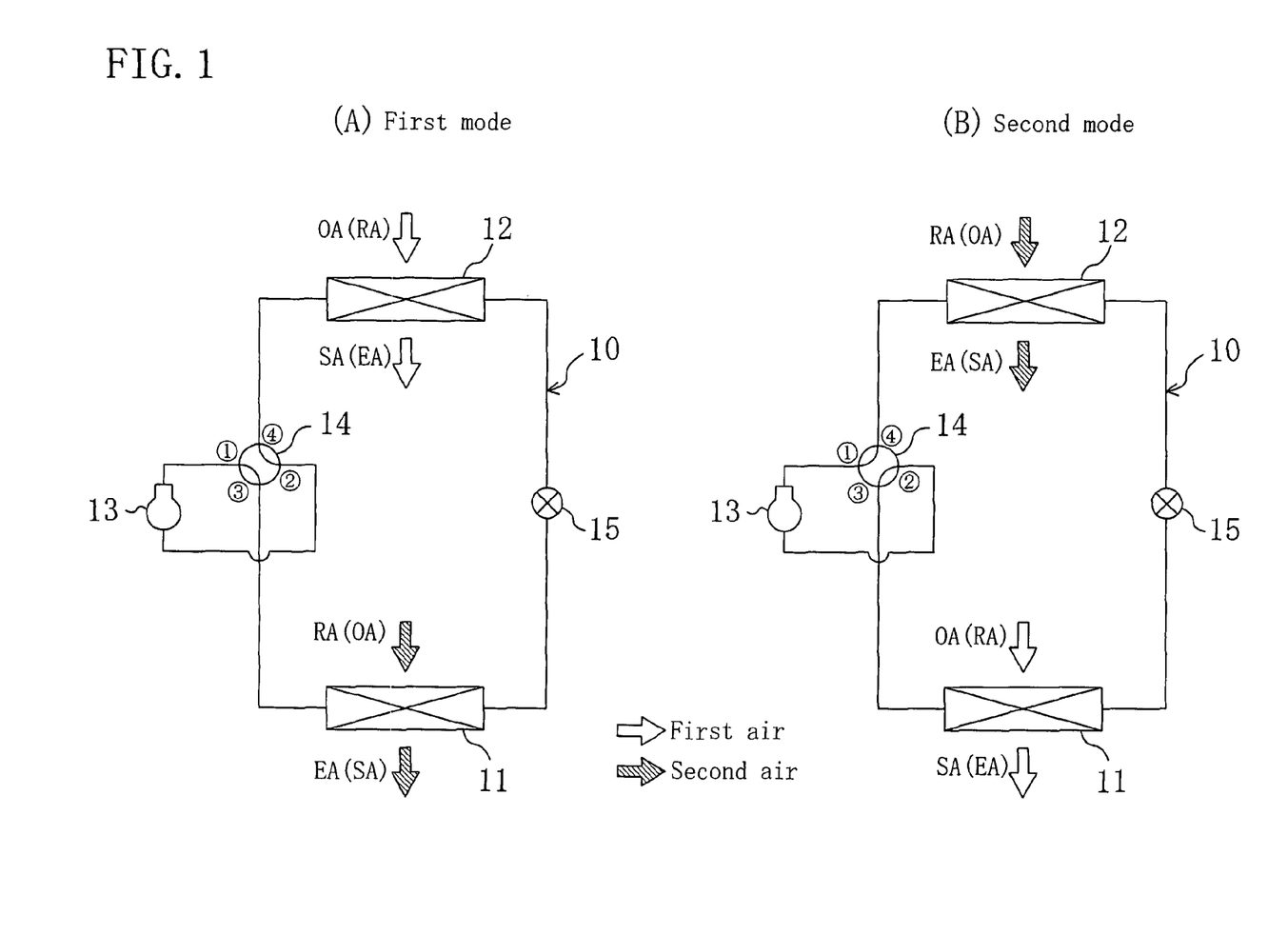
FIG. 1 is a refrigerant circuit diagram showing the configuration and behavior of a refrigerant circuit in Embodiment 1, wherein FIG. 1A indicates its state in a first mode and FIG. 1B indicates its state in a second mode.

The humidity control system includes a refrigerant circuit (10). As shown in FIG. 1, the refrigerant circuit (10) is a closed circuit in which a first adsorption element (11), a second adsorption element (12), a compressor (13), a four-way selector valve (14) and a motor-operated expansion valve (15) are disposed and is filled with refrigerant. The refrigerant circuit (10) allows the filled refrigerant to circulate therethrough to operate in a vapor compression refrigeration cycle. Further, the first adsorption element (11) and the second adsorption element (12) are each constituted by an adsorption heat exchanger (20) according to the present invention. The details of the adsorption heat exchanger (20) will be described later.

In the refrigerant circuit (10), the compressor (13) is connected at its discharge side to a first port of the four-way selector valve (14) and connected at its suction side to a second port of the four-way selector valve (14). One end of the first adsorption element (11) is connected to a third port of the four-way selector valve (14). The other end of the first adsorption element (11) is connected through the motor-operated expansion valve (15) to one end of the second adsorption element (12). The other end of the second adsorption element (12) is connected to a fourth port of the four-way selector valve (14).

The four-way selector valve (14) is configured to be switchable between a first position in which the first and third ports communicate with each other and the second and fourth ports communicate with each other (the position shown in FIG. 1A) and a position in which the first and fourth ports communicate with each other and the second and third ports communicate with each other (the position shown in FIG. 1B).

As described above, the first adsorption element (11) and the second adsorption element (12) are each constituted by an adsorption heat exchanger (20). The adsorption heat exchanger (20) is described with reference to FIGS. 2, 3 and 4.

Figure 2:
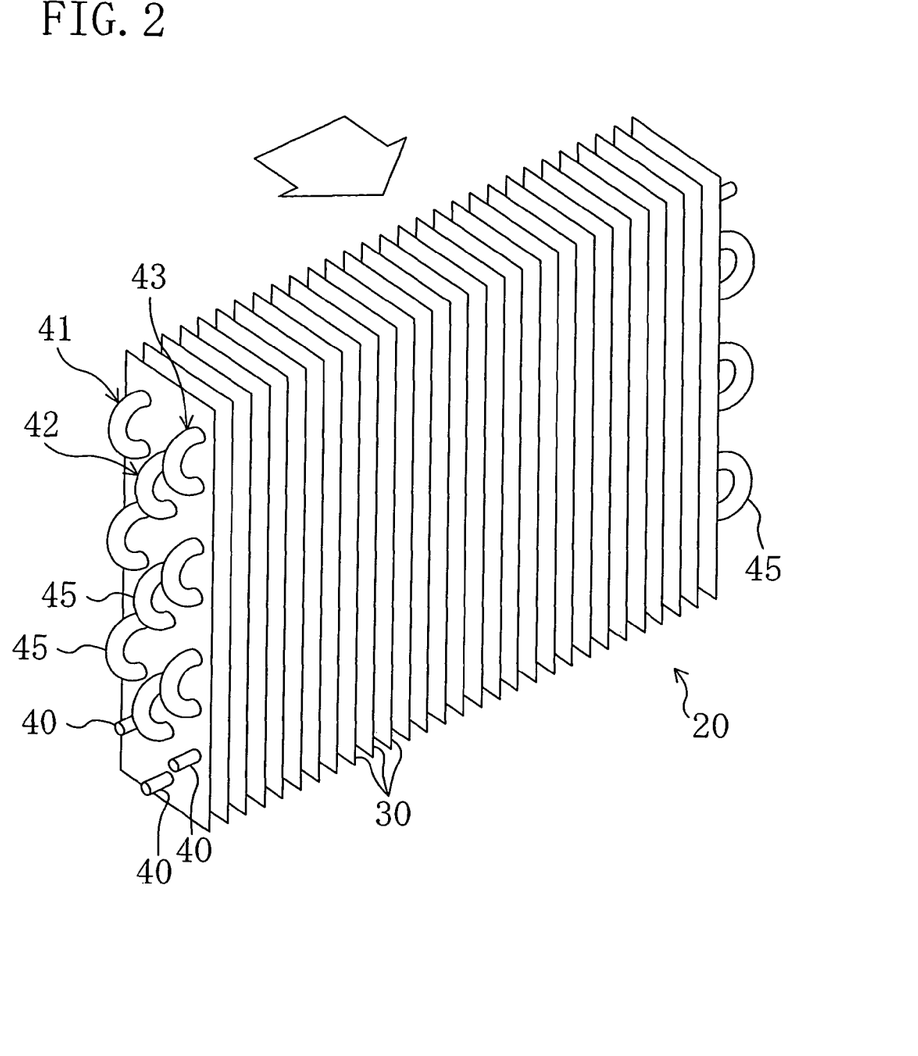
FIG. 2 is a perspective view of an adsorption heat exchanger in Embodiment 1.

As shown in FIG. 2, the adsorption heat exchanger (20) is a so-called cross fin type fine-and-tube heat exchanger. The adsorption heat exchanger (20) includes a plurality of heat exchange tubes (40) and a plurality of fins (30). The fins (30) are each formed in the shape of a rectangular plate and are juxtaposed at spaced intervals. Each heat exchange tube (40) is constituted by a substantially straight tube and passes through the spaced-apart, juxtaposed fins (30). In other words, in the adsorption heat exchanger (20), a large number of fins (30) are arranged at equal intervals along the axial direction of each heat exchange tube (40).

Figure 3:
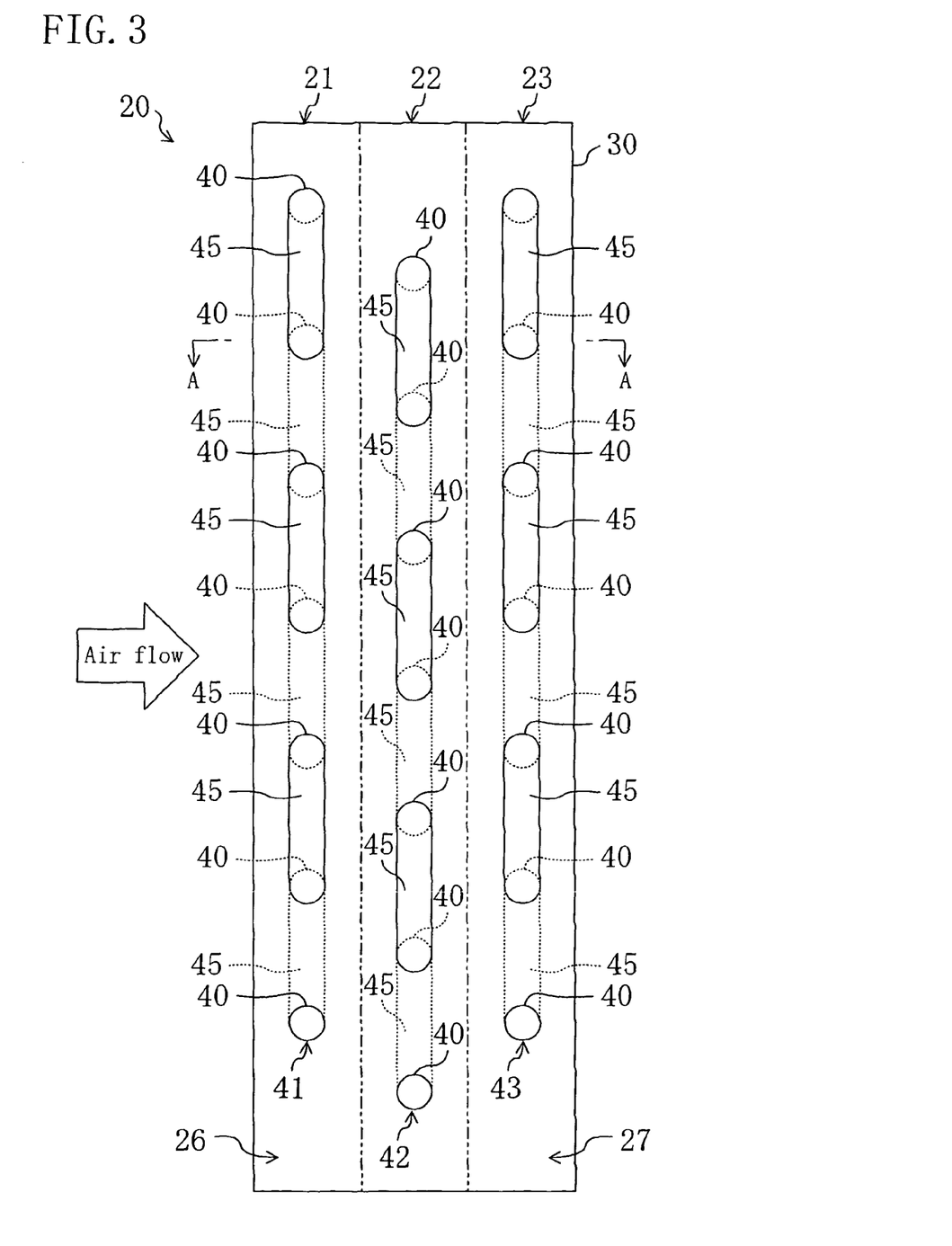
FIG. 3 is a side view of the adsorption heat exchanger in Embodiment 1.

As also shown in FIG. 3, in the adsorption heat exchanger (20), the heat exchange tubes (40) are staggered. Specifically, in the adsorption heat exchanger (20), the heat exchange tubes (40) are arranged with a predetermined pitch along the long edges of the fins (30). Further, in the adsorption heat exchanger (20), the heat exchange tubes (40) are arranged also with a predetermined pitch along the short edges of the fins (30). The pitch of the heat exchange tubes (40) along the direction of the long edges of the fins (30) is referred to as a tier pitch and the pitch thereof along the direction of the short edges of the fins (30) is referred to as a column pitch.

In the adsorption heat exchanger (20), a single tube column is constituted by a set of heat exchange tubes (40) aligned in a column along the long edges of the fins (30). The adsorption heat exchanger (20) has three tube columns (41, 42, 43) of this type formed therein. Out of the three tube columns (41, 42, 43), each pair of adjacent tube columns are offset by half a tier pitch lengthwise of the fins (30) with respect to each other. In each tube column (41, 42, 43), each pair of adjacent heat exchange tubes (40) are connected to each other by a U-tube (45) so that all the heat exchange tubes (40) form a single path. Out of the three tube columns (41, 42, 43), the first tube column (41) is constituted by a tube column located most upstream in the air flow (to the left in FIGS. 3 and 4), the second tube column (42) is constituted by a tube column next to the first tube column (41), and the third tube column (43) is constituted by a tube column located most downstream in the air flow (to the right in FIGS. 3 and 4).

Figure 4:
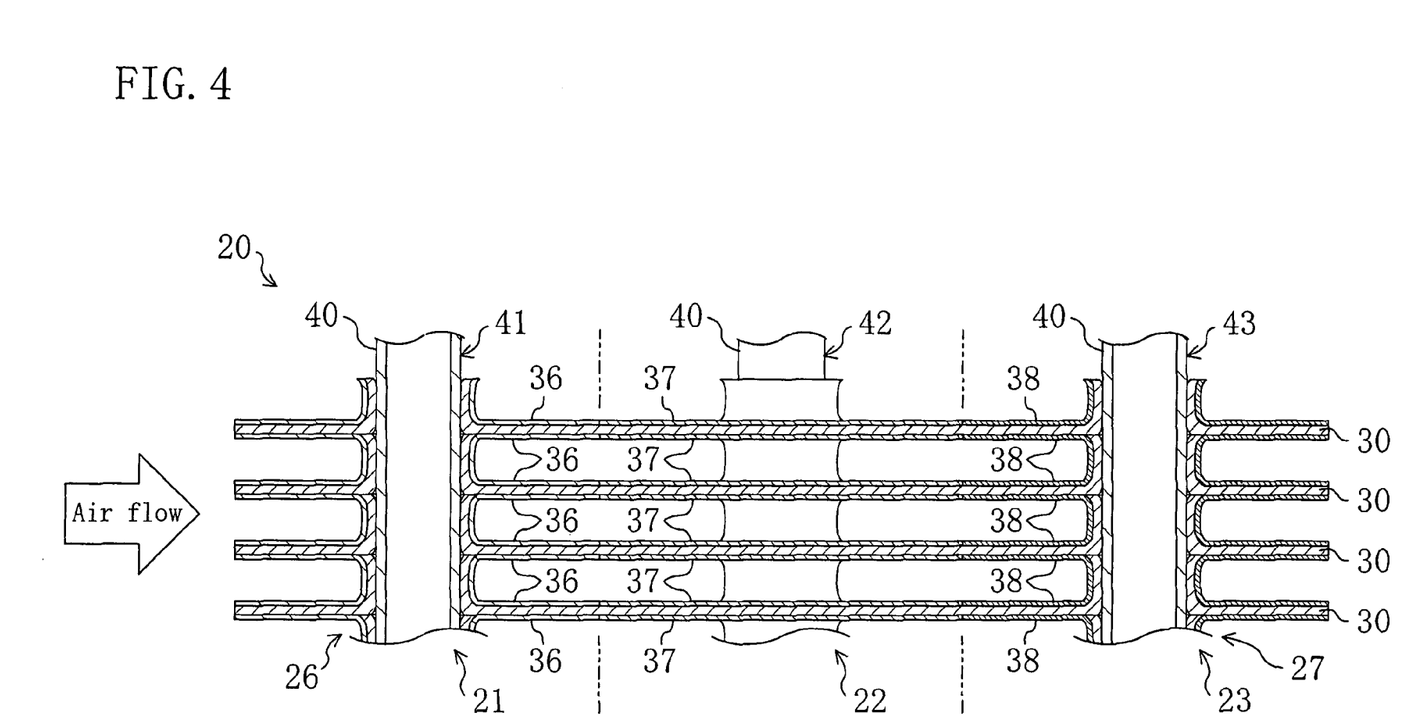
FIG. 4 is a cross-sectional view showing part of a cross section of the adsorption heat exchanger taken along the line A-A of FIG. 3.

In the adsorption heat exchanger (20), a first column part (21), a second column part (22) and a third column part (23) are formed sequentially along the flow direction of air passing through the adsorption heat exchanger (20) (i.e., the left-to-right direction in FIGS. 3 and 4). Specifically, in the adsorption heat exchanger (20), the first column part (21) is formed by a part of the adsorption heat exchanger (20) extending from the front edge to the middle between the first tube column (41) and the second tube column (42), the second column part (22) is formed by a part of the adsorption heat exchanger (20) extending from the middle between the first tube column (41) and the second tube column (42) to the middle between the second tube column (42) and the third tube column (43), and the third column part (23) is formed by a part of the adsorption heat exchanger (20) extending from the middle between the second tube column (42) and the third tube column (43) to the rear edge. In other words, in the adsorption heat exchanger (20), the first column part (21), the second column part (22) and the third column part (23) are formed in order from upstream to downstream in the air flow (from left to right in FIGS. 3 and 4). Further, in the adsorption heat exchanger (20), the first column part (21) provides an upstream part (26) and the third column part (23) provides a downstream part (27).

As shown in FIG. 4, the surface of each fin (30) has three types of adsorption layers (36, 37, 38) formed thereon. Specifically, in each fin (30) of the adsorption heat exchanger (20), the first adsorption layer (36) is formed on a region of the surface located corresponding to the first column part (21), the second adsorption layer (37) is formed on a region of the surface located corresponding to the second column part (22), and the third adsorption layer (38) is formed on a region of the surface located corresponding to the third column part (23). Each adsorption layer (36, 37, 38) is made of an adsorbent of powdered zeolite and a binder, such as urethane resin. In each adsorption layer (36, 37, 38), zeolite particles constituting the adsorbent are bound to other zeolite particles and the fins (30) by the binder.

In each adsorption layer (36, 37, 38), the ratio between the adsorbent and the binder is set at a predetermined value. The ratio between the adsorbent and the binder differs with each adsorption layer (36, 37, 38). Specifically, the mass content of adsorbent in each adsorption layer (36, 37, 38) increases in order of the first adsorption layer (36), the second adsorption layer (37) and the third adsorption layer (38). In other words, out of these three adsorption layers (36, 37, 38), one located more downstream in the air flow has a higher mass content of adsorbent than the others. In this manner, the third column part (23) downstream in the air flow has a larger amount of adsorbent carried on the fins (30) than the first column part (21) located upstream in the air flow so that the amount of moisture adsorbed on the fins (30) can be uniform from the first column part (21) to the third column part (23).

On the other hand, the mass content of binder in each adsorption layer (36, 37, 38) decreases in order of the first adsorption layer (36), the second adsorption layer (37) and the third adsorption layer (38). As described above, in each adsorption layer (36, 37, 38), zeolite particles serving as adsorbent are bound to other zeolite particles and the fins (30) by the binder. Therefore, zeolite particles in each adsorption layer (36, 37, 38) are covered at part of their surface with the binder. As the mass content of binder in the adsorption layer (36, 37, 38) decreases, each zeolite particle increases the area of part of its surface capable of contact with air without being covered with the binder and, in turn, the moisture adsorption capacity of the adsorption layer (36, 37, 38) increases. In other words, zeolite particles serving as adsorbent in the adsorption heat exchanger (20) increase their surface areas of capable of contact with air in order of the first adsorption layer (36), the second adsorption layer (37) and the third adsorption layer (38). This also uniforms the amount of moisture adsorbed on the fins (30) from the first column part (21) to the third column part (23).

As described above, in the adsorption heat exchanger (20), the adsorption layers (36, 37, 38) have different mixture ratios of adsorbent and binder. As a result, in the adsorption heat exchanger (20), the static capacity of each adsorption layer (36, 37, 38) formed on the fins (30) increases in order of the first adsorption layer (36), the second adsorption layer (37) and the third adsorption layer (38). Further, in the adsorption heat exchanger (20), the increase of static capacity in order of the first adsorption layer (36), the second adsorption layer (37) and the third adsorption layer (38) provides a uniform amount of moisture adsorbed on the fins (30) from the first column part (21) to the third column part (23).

The static capacity of the adsorption layer (36, 37, 38) is herein expressed by the amount of moisture that the adsorption layer (36, 37, 38) can adsorb when the fins (30) having the adsorption layer (36, 37, 38) formed thereon are brought into contact with air of constant relative humidity for a sufficiently long time, i.e., the amount of moisture that the adsorption layer (36, 37, 38) has adsorbed until equilibrium is reached under conditions of coexistence of the adsorption layer (36, 37, 38) and air of constant relative humidity.

-Operational Behavior-

The humidity control system can perform a dehumidification operation and a humidification operation. During each of dehumidification operation and humidification operation, the humidity control system alternately repeats a first mode and a second mode at specified time intervals (for example, at intervals of five minutes).

During dehumidification operation, the humidity control system takes in an outdoor air (OA) as a first air and room air (RA) as a second air. During humidification operation, the humidity control system takes in room air (RA) as a first air and an outdoor air (OA) as a second air.

First, a description is given of the first mode. During the first mode, the second air is sent into the first adsorption element (11) and the first air is sent into the second adsorption element (12). In the first mode, the first adsorption element (11) is in regeneration phase and the second adsorption element (12) is in adsorption phase.

As shown in FIG. 1A, in the refrigerant circuit (10) in the first mode, the four-way selector valve (14) is set to the first position. When the compressor (13) is driven, the refrigerant circuit (10) circulates refrigerant therethrough to operate in a refrigeration cycle. In the refrigerant circuit (10) during the cycle, the first adsorption element (11) functions as a condenser and the second adsorption element (12) functions as an evaporator.

Specifically, refrigerant discharged from the compressor (13) releases heat in the first adsorption element (11) to become condensed. The refrigerant condensed in the first adsorption element (11) is reduced in pressure during passage through the motor-operated expansion valve (15) and then takes heat in the second adsorption element (12) to become evaporated. The refrigerant evaporated in the second adsorption element (12) is sucked into the compressor (13), compressed therein and discharged again from the compressor (13).

In the first adsorption element (11) constituted by an adsorption heat exchanger (20), the adsorption layers (36-38) on the surfaces of the fins (30) are heated by the refrigerant in the heat exchange tubes (40) and moisture desorbed from the heated adsorption layers (36-38) is applied to the second air. In the second adsorption element (12) likewise constituted by an adsorption heat exchanger (20), moisture in the first air is adsorbed on the adsorption layers (36-38) on the surfaces of the fins (30) and heat of adsorption thus produced is taken by the refrigerant in the heat exchange tubes (40).

Further, during dehumidification operation, the first air dehumidified by the second adsorption element (12) is supplied to the room and moisture desorbed from the first adsorption element (11) is exhausted to the outside atmosphere together with the second air. On the other hand, during humidification operation, the second air humidified by the first adsorption element (11) is supplied to the room and the first air dried by the second adsorption element (12) is exhausted to the outside atmosphere.

Next, a description is given of the second mode. During the second mode, the first air is sent into the first adsorption element (11) and the second air is sent into the second adsorption element (12). In the second mode, the second adsorption element (12) is in regeneration phase and the first adsorption element (11) is in adsorption phase.

As shown in FIG. 1B, in the refrigerant circuit (10) in the second mode, the four-way selector valve (14) is set to the second position. When the compressor (13) is driven, the refrigerant circuit (10) circulates refrigerant therethrough to operate in a refrigeration cycle. In the refrigerant circuit (10) during the cycle, the second adsorption element (12) functions as a condenser and the first adsorption element (11) functions as an evaporator.

Specifically, refrigerant discharged from the compressor (13) releases heat in the second adsorption element (12) to become condensed. The refrigerant condensed in the second adsorption element (12) is reduced in pressure during passage through the motor-operated expansion valve (15) and then takes heat in the first adsorption element (11) to become evaporated. The refrigerant evaporated in the first adsorption element (11) is sucked into the compressor (13), compressed therein and discharged again from the compressor (13).

In the second adsorption element (12) constituted by an adsorption heat exchanger (20), the adsorption layers (36-38) on the surfaces of the fins (30) are heated by the refrigerant in the heat exchange tubes (40) and moisture desorbed from the heated adsorption layers (36-38) is applied to the second air. In the first adsorption element (11) likewise constituted by an adsorption heat exchanger (20), moisture in the first air is adsorbed on the adsorption layers (36-38) on the surfaces of the fins (30) and heat of adsorption thus produced is taken by the refrigerant in the heat exchange tubes (40).

Further, during dehumidification operation, the first air dehumidified by the first adsorption element (11) is supplied to the room and moisture desorbed from the second adsorption element (12) is exhausted to the outside atmosphere together with the second air. On the other hand, during humidification operation, the second air humidified by the second adsorption element (12) is supplied to the room and the first air dried by the first adsorption element (11) is exhausted to the outside atmosphere.

Next, a description is given of the course of moisture in the air being adsorbed on the adsorption layers (36-38) in the adsorption heat exchanger (20) with reference to FIG. 4.

The air sent into the adsorption heat exchanger (20) flows into spaces between the fins (30) and sequentially passes through the first column part (21), the second column part (22) and the third column part (23).

In the first column part (21), in the course of passage of air between the fins (30), the air comes into contact with the first adsorption layer (36) so that moisture in the air is gradually adsorbed on the first adsorption layer (36). In other words, in the course of passage of air through the first column part (21), the absolute humidity of the air gradually decreases. Therefore, in the first column part (21), the passing air is cooled by heat exchange with the refrigerant. However, when the first adsorption layer (36) adsorbs moisture, heat of adsorption is produced, which does not decrease the air temperature so much. Hence, in the course of passage of air through the first column part (21), the relative humidity of the air also gradually decreases.

In the second column part (22), the air reduced in relative humidity in the course of passage through the first column part (21) comes into contact with the second adsorption layer (37) so that moisture in the air is gradually adsorbed on the second adsorption layer (37). As described above, the amount of adsorbent contained in the second adsorption layer (37) is larger than the amount of adsorbent contained in the first adsorption layer (36). In addition, as compared to the first adsorption layer (36), each of zeolite particles serving as an adsorbent in the second adsorption layer (37) has a greater area of part of the surface capable of contact with air. Therefore, the second adsorption layer (37) can adsorb moisture, even from the air having a reduced relative humidity, as much as the first adsorption layer (36) can. In other words, also in the second column part (22) located downstream in air flow from the first column part (21), an amount of moisture adsorbed as much as in the first column part (21) can be ensured. Therefore, also in the course of passage of air through the second adsorption layer (22), the absolute humidity and relative humidity gradually of the air gradually decrease as in the course of passage of air through the first column part (21).

In the third column part (23), the air reduced in relative humidity in the course of passage through the second column part (22) comes into contact with the third adsorption layer (38) so that moisture in the air is gradually adsorbed on the third adsorption layer (38). As described above, the amount of adsorbent contained in the third adsorption layer (38) is larger than the amount of adsorbent contained in the second adsorption layer (37). In addition, as compared to the second adsorption layer (37), each of zeolite particles serving as an adsorbent in the third adsorption layer (38) has a greater area of part of the surface capable of contact with air. Therefore, the third adsorption layer (38) can adsorb moisture, even from the air having a reduced relative humidity, as much as the second adsorption layer (37) can. In other words, also in the third column part (23) located downstream in air flow from the second column part (22), an amount of moisture adsorbed as much as in the second column part (22) can be ensured. Therefore, also in the course of passage of air through the third adsorption layer (23), the absolute humidity and relative humidity of the air gradually decrease as in the course of passage of air through the first column part (21). Then, the air having passed through the third column part (23) flows out of between the fins (30) and sent out to downstream of the adsorption heat exchanger (20).

-Effects of Embodiment 1-

In the humidity control system of this embodiment, the surfaces of the fins (30) of the adsorption heat exchanger (20) constituting each of the first adsorption element (11) and the second adsorption element (12) each have the first adsorption layer (36), the second adsorption layer (37) and the third adsorption layer (38) formed in order from upstream to downstream in the air flow. Further, in the adsorption heat exchanger (20), the mass content of adsorbent in each adsorption layer (36, 37, 38) increases in order of the first adsorption layer (36), the second adsorption layer (37) and the third adsorption layer (38). Furthermore, in the adsorption heat exchanger (20), the mass content of binder in each adsorption layer (36, 37, 38) decreases in order of the first adsorption layer (36), the second adsorption layer (37) and the third adsorption layer (38), whereby, for zeolite particles serving as an adsorbent, the area of part of their surfaces capable of contact with air increases in order of the first adsorption layer (36), the second adsorption layer (37) and the third adsorption layer (38).

Therefore, in the adsorption heat exchanger (20), the adsorption capacity of each adsorption layer (36, 37, 38) increases in order of the first adsorption layer (36), the second adsorption layer (37) and the third adsorption layer (38) and an amount of moisture adsorbed as much as on the first adsorption layer (36) can be ensured also on the second adsorption layer (37) and the third adsorption layer (38) both of which will come into contact with air reduced in relative humidity in the course of passage between the fins (30). Therefore, according to the adsorption heat exchanger (20) of this embodiment, its moisture adsorption capacity can be enhanced by uniforming the amount of moisture adsorbed in every part of the adsorption heat exchanger (20).

-Modification 1 of Embodiment 1-

In the above adsorption heat exchanger (20), the differences in the amount of adsorbent between the adsorption layers (36, 37, 38) may be implemented by allowing the adsorption layers (36, 37, 38) to have different thicknesses. In this case, the thickness increases in order of the first adsorption layer (36), the second adsorption layer (37) and the third adsorption layer (38). As described above, as the amount of adsorbent contained in the adsorption layer (36, 37, 38) increases, the adsorption capacity of the adsorption layer (36, 37, 38) becomes higher. Therefore, also in this modification, the amount of moisture adsorbed on each adsorption layer (36, 37, 38) can be uniform.

-Modification 2 of Embodiment 1-

The adsorption heat exchanger (20) may be configured so that the first adsorption layer (36) and the second adsorption layer (37) are provided with equal amounts of adsorbent and the third adsorption layer (38) is provided with a larger amount of adsorbent than the first adsorption layer (36) and the second adsorption layer (37). Also in the adsorption heat exchanger (20) of this modification, a larger amount of adsorbent is provided on the third adsorption layer (38) formed on surface regions of the fins (30) located within the downstream part (27) than on the first adsorption layer (36) formed on surface regions of the fins (30) located within the upstream part (26).

Embodiment 2 of the Invention

A description is given of Embodiment 2 of the present invention. This embodiment differs from the humidity control system of Embodiment 1 in the composition of the adsorption heat exchanger (20).

In the adsorption heat exchanger (20) of this embodiment, the substance used as an adsorbent is different in each adsorption layer (36, 37, 38). Specifically, in the adsorption heat exchanger (20), the first adsorption layer (36) is provided with zeolite only as an adsorbent, the second adsorption layer (37) is provided with a mixture of zeolite and silica gel as an adsorbent and the third adsorption layer (38) is provided with silica gel only as an adsorbent. In the adsorption heat exchanger (20), the static capacity of each substance used as an adsorbent increases in order of the first adsorption layer (36), the second adsorption layer (37) and the third adsorption layer (38). Therefore, in the adsorption heat exchanger (20), the static capacity of each adsorption layer (36, 37, 38) formed on the surfaces of the fins (30) increases in order of the first adsorption layer (36), the second adsorption layer (37) and the third adsorption layer (38).

The static capacity of the adsorbent is herein expressed by the amount of moisture that the adsorbent can adsorb when brought into contact with air of constant relative humidity for a sufficiently long time, i.e., the amount of moisture that the adsorbent has adsorbed until equilibrium is reached under conditions of coexistence of the adsorbent and air of constant relative humidity.

A description is given of the course of moisture in the air being adsorbed on the adsorption layers in the adsorption heat exchanger (20). As in Embodiment 1, the air sent into the adsorption heat exchanger (20) flows into spaces between the fins (30) and sequentially passes through the first column part (21), the second column part (22) and the third column part (23).

In the first column part (21), in the course of passage of air between the fins (30), the air comes into contact with the first adsorption layer (36) so that moisture in the air is gradually adsorbed on the first adsorption layer (36). In other words, in the course of passage of air through the first column part (21), the absolute humidity of the air gradually decreases. Therefore, in the first column part (21), the passing air is cooled by heat exchange with the refrigerant. However, when the first adsorption layer (36) adsorbs moisture, heat of adsorption is produced, which does not decrease the air temperature so much. Hence, in the course of passage of air through the first column part (21), the relative humidity of the air also gradually decreases.

In the second column part (22), the air reduced in relative humidity in the course of passage through the first column part (21) comes into contact with the second adsorption layer (37) so that moisture in the air is gradually adsorbed on the second adsorption layer (37). As described above, the adsorbent in the second adsorption layer (37) has a higher static capacity than the adsorbent in the first adsorption layer (36). Therefore, the second adsorption layer (37) can adsorb moisture, even from the air having a reduced relative humidity, as much as the first adsorption layer (36) can. In other words, also in the second column part (22) located downstream in air flow from the first column part (21), an amount of moisture adsorbed as much as in the first column part (21) can be ensured. Therefore, also in the course of passage of air through the second adsorption layer (22), the absolute humidity and relative humidity of the air gradually decrease as in the course of passage of air through the first column part (21).

In the third column part (23), the air reduced in relative humidity in the course of passage through the second column part (22) comes into contact with the third adsorption layer (38) so that moisture in the air is gradually adsorbed on the third adsorption layer (38). As described above, the adsorbent in the third adsorption layer (38) has a higher static capacity than the adsorbent in the second adsorption layer (37). Therefore, the third adsorption layer (38) can adsorb moisture, even from the air having a reduced relative humidity, as much as the second adsorption layer (37) can. In other words, also in the third column part (23) located downstream in air flow from the second column part (22), an amount of moisture adsorbed as much as in the second column part (22) can be ensured. Therefore, also in the course of passage of air through the third adsorption layer (23), the absolute humidity and relative humidity of the air gradually decrease as in the course of passage of air through the first column part (21). Then, the air having passed through the third column part (23) flows out of between the fins (30) and sent out to downstream of the adsorption heat exchanger (20).

Thus, in the adsorption heat exchanger (20), an amount of moisture adsorbed as much as on the first column part (21) located upstream in air flow can be ensured also on the second column part (22) and the third column part (23) both of which are located downstream in air flow. Therefore, according to the adsorption heat exchanger (20) of this embodiment, its moisture adsorption capacity can be enhanced by uniforming the amount of moisture adsorbed in every part of the adsorption heat exchanger (20).

-Modification of Embodiment 2-

In the above adsorption heat exchanger (20), the first adsorption layer (36) and the second adsorption layer (37) may be provided with the same substance as their adsorbent and the third adsorption layer (38) may be provided with, as its adsorbent, a different substance from that for the first adsorption layer (36) and the second adsorption layer (37). For example, the first adsorption layer (36) and the second adsorption layer (37) may be provided with zeolite as their adsorbent and the third adsorption layer (38) may be provided with silica gel as its adsorbent. Also in the adsorption heat exchanger (20) of this modification, an adsorbent having a higher static capacity is provided on the third adsorption layer (38) formed on surface regions of the fins (30) located within the downstream part (27) than on the first adsorption layer (36) formed on surface regions of the fins (30) located within the upstream part (26).

In the above adsorption heat exchanger (20), substances other than zeolite and silica gel may be used as adsorbents, for example, organic polymeric materials having hydrophilic or water-absorbing functional groups, ion-exchange resin materials having carbonic aid groups or sulfonic acid groups, or clay mineral materials. In these cases, substances provided as adsorbents in the adsorption layers (36, 37, 38) are appropriately selected according to their respective static capacities so that the first adsorption layer (36), the second adsorption layer (37) and the third adsorption layer (38) have static capacities increasing in this order. Alternatively, these materials may not be used singly for each adsorption layer (36, 37, 38) or a mixture of these materials may be provided in various combinations for each adsorption layer (36, 37, 38).

Other Embodiments

In each of the above embodiments, the adsorption heat exchanger (20) may have the following configurations.

-First Variant-

In the adsorption heat exchanger (20), the fins (30) may be cut in units of the column parts (21, 22, 23).

Figure 5:
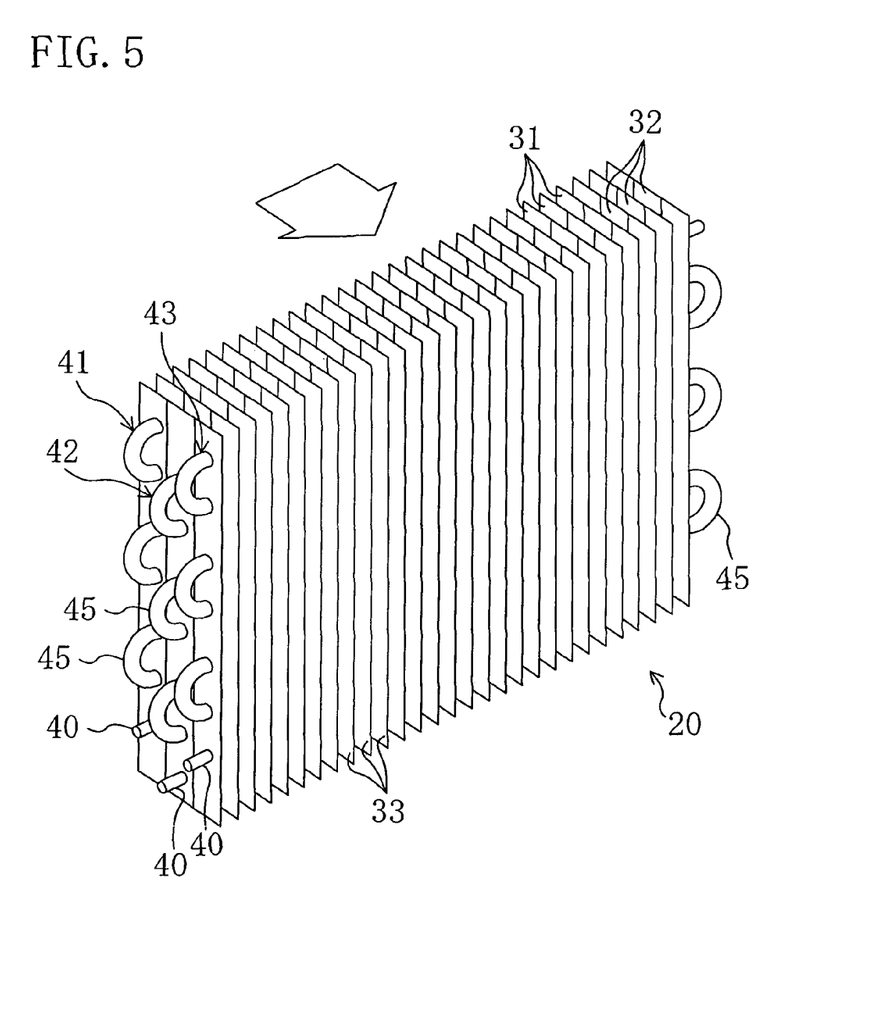
FIG. 5 is a perspective view of an adsorption heat exchanger in a first variant of another embodiment.
Figure 6:
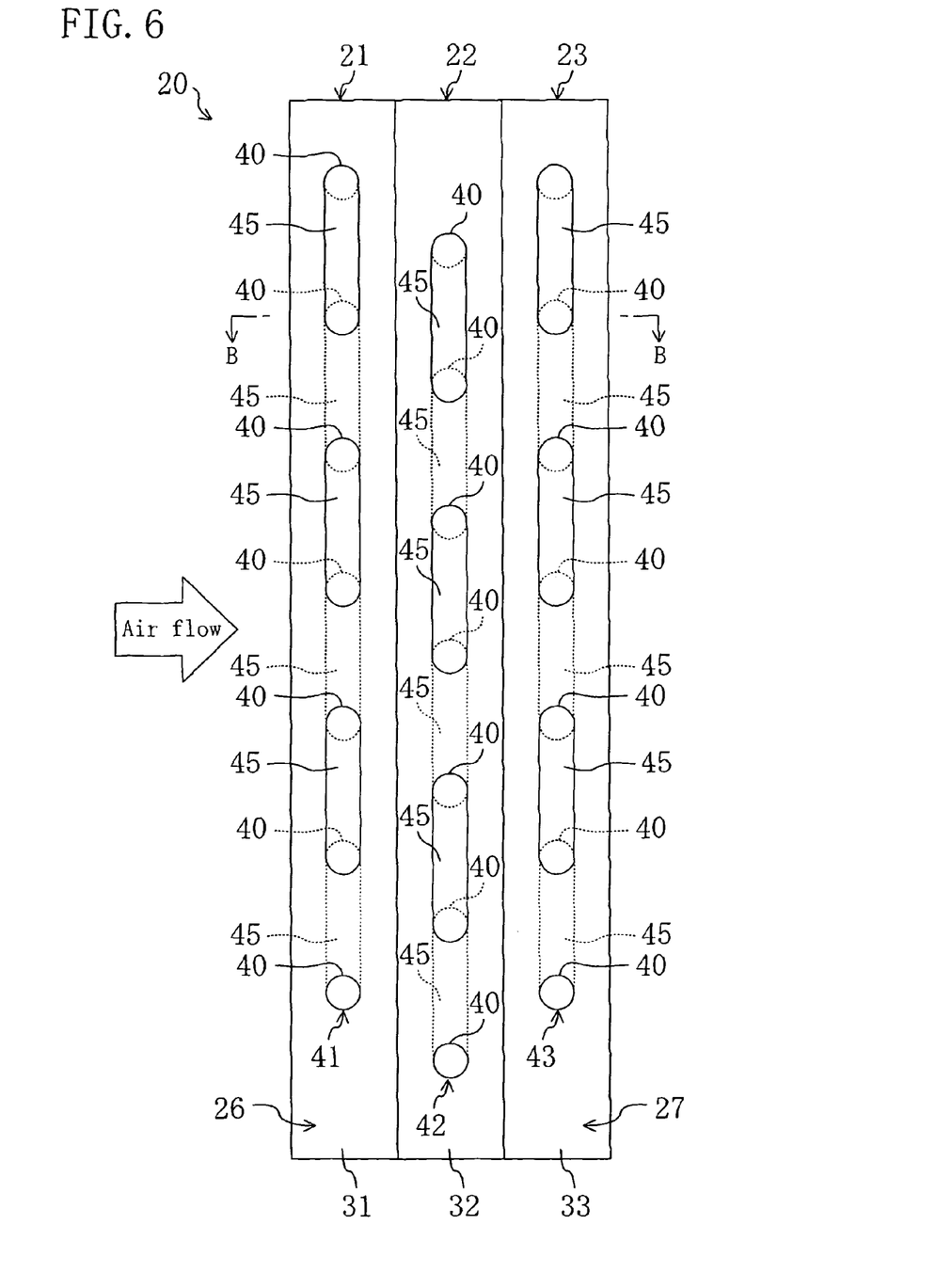
FIG. 6 is a side view of the adsorption heat exchanger in the first variant of said another embodiment.
Figure 7:
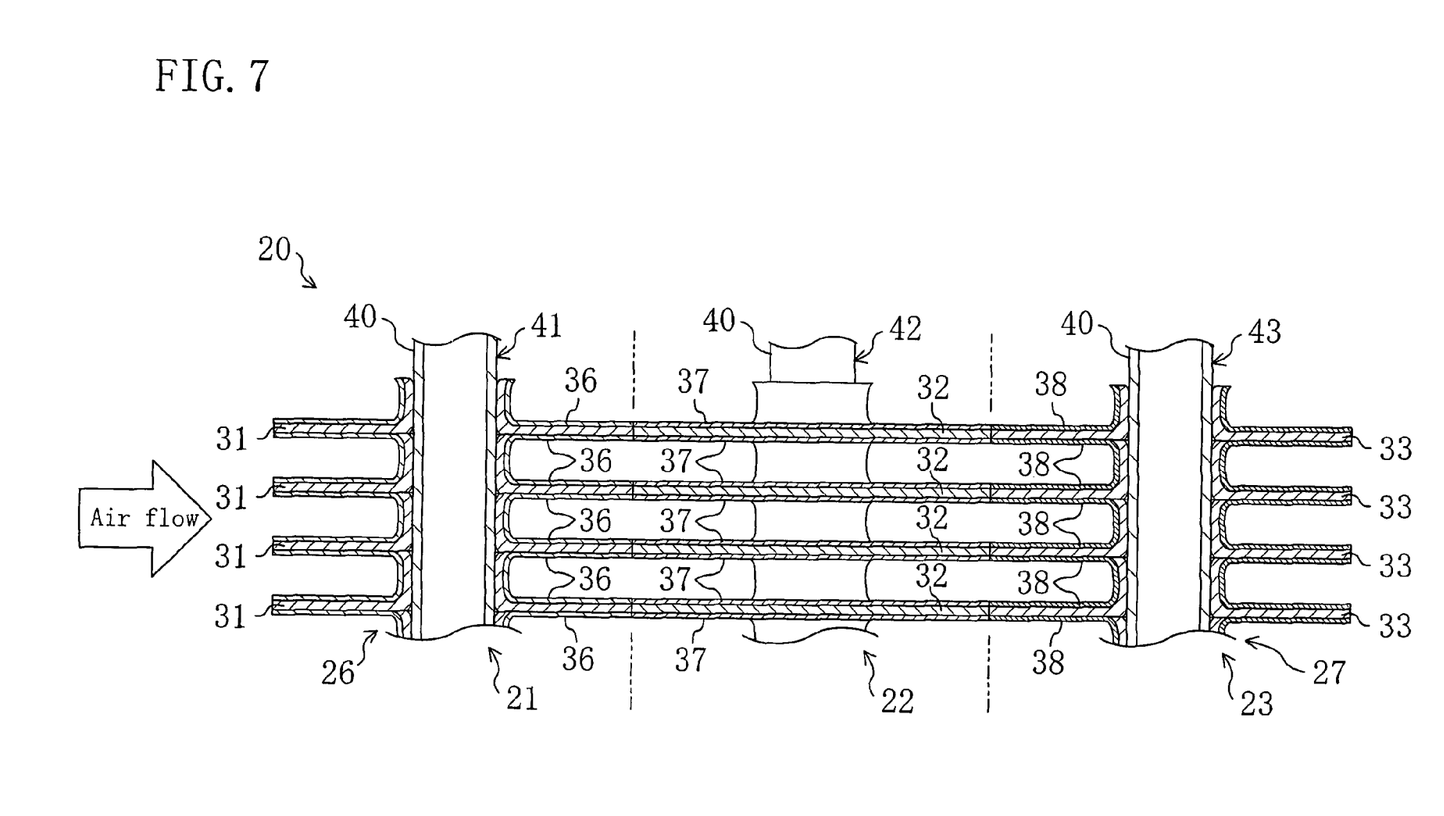
FIG. 7 is a cross-sectional view showing part of a cross section of the adsorption heat exchanger taken along the line B-B of FIG. 6.

As shown in FIGS. 5, 6 and 7, in the adsorption heat exchanger (20) of this variant, the first column part (21) is provided with first fins (31), the second column part (22) with second fins (32), and the third column part (23) with third fins (33). The first fins (31) are joined only to the heat exchange tubes (40) of the first tube column (41), the second fins (32)

are joined only to the heat exchange tubes (40) of the second tube column (42), and the third fins (33) are joined only to the heat exchange tubes (40) of the third tube column (43). Further, the first adsorption layer (36) is formed on the surfaces of the first fins (31), the second adsorption layer (37) is formed on the surfaces of the second fins (32), and the third adsorption layer (38) is formed on the surfaces of the third fins (33).

-Second Variant-

Though each of the above adsorption heat exchangers (20) is provided with three tube columns (41, 42, 43), the number of tube columns provided in the adsorption heat exchanger (20) is not limited to this.

Figure 8:
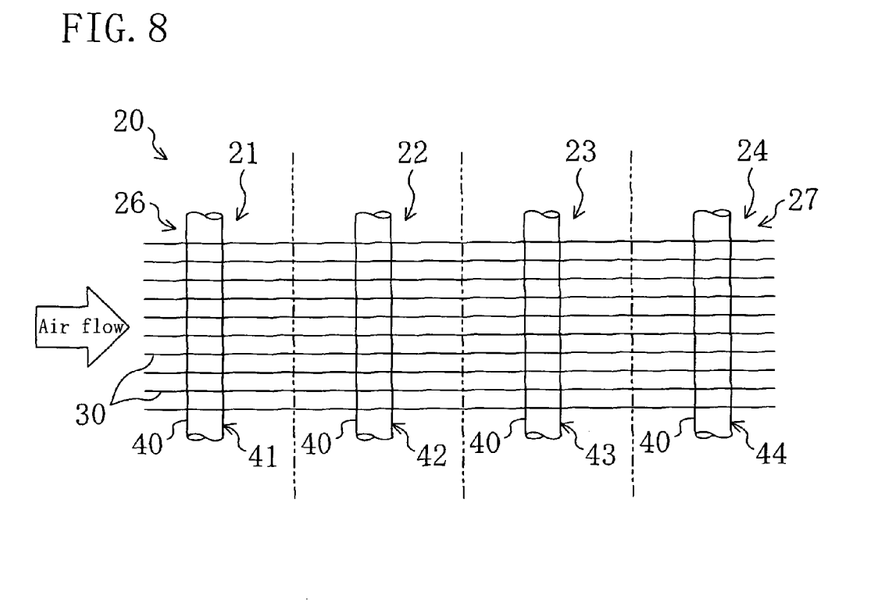
FIG. 8 is a schematic side view of an adsorption heat exchanger in a second variant of said another embodiment.
Figure 9:
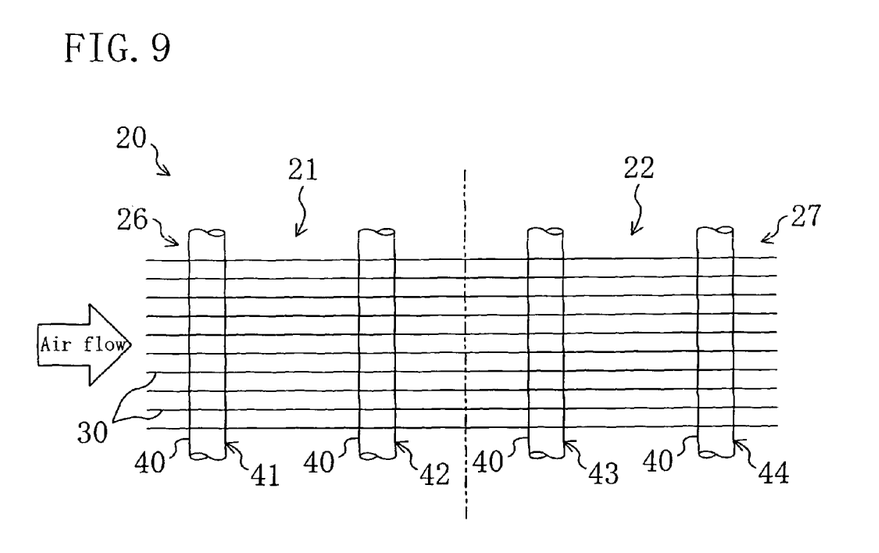
FIG. 9 is a schematic side view of an adsorption heat exchanger in the second variant of said another embodiment.

For example, as shown in FIGS. 8 and 9, the adsorption heat exchanger (20) may be provided with four tube columns (41, 42, 43, 44). In this case, in the adsorption heat exchanger (20), the first tube column (41), the second tube column (42), the third tube column (43) and the fourth tube column (44) are sequentially arranged from upstream to downstream in air flow.

In the adsorption heat exchanger (20) of this variant, as shown in FIG. 8, one column part may be formed for one tube column. Specifically, in this adsorption heat exchanger (20), a first column part (21) is constituted by a part of the adsorption heat exchanger (20) extending from the front edge to the middle between the first tube column (41) and the second tube column (42), a second column part (22) is constituted by a part of the adsorption heat exchanger (20) extending from the middle between the first tube column (41) and the second tube column (42) to the middle between the second tube column (42) and the third tube column (43), a third column part (23) is constituted by a part of the adsorption heat exchanger (20) extending from the middle between the second tube column (42) and the third tube column (43) and the middle between the third tube column (43) and the fourth tube column (44), and a fourth column part (24) is constituted by a part of the adsorption heat exchanger (20) extending from the middle between the third tube column (43) and the fourth tube column (44) to the rear edge.

In other words, the adsorption heat exchanger (20) has the first column part (21), the second column part (22), the third column part (23) and the fourth column part (24) formed in order from upstream to downstream in air flow (from left to right in FIG. 8). In this adsorption heat exchanger (20), the first column part (21) provides an upstream part (26) and the fourth column part (24) provides a downstream part (27).

In the adsorption heat exchanger (20) shown in FIG. 8, each fin (30) has the first adsorption layer (36) formed on a region thereof located corresponding to the first column part (21), the second adsorption layer (37) formed on a region thereof corresponding to the second column part (22), the third adsorption layer (38) formed on a region thereof corresponding to the third column part (23), and the fourth adsorption layer (39) formed on a region thereof corresponding to the fourth column part (24). Where this variant is applied to the adsorption heat exchanger (20) of Embodiment 1, the mass content of adsorbent in each adsorption layer (36-39) increases in order of the first adsorption layer (36), the second adsorption layer (37), the third adsorption layer (38) and the fourth adsorption layer (39). Where this variant is applied to the adsorption heat exchanger (20) of Embodiment 2, the static capacity of adsorbent provided in each adsorption layer (36-39) increases in order of the first adsorption layer (36), the second adsorption layer (37), the third adsorption layer (38) and the fourth adsorption layer (39).

In the adsorption heat exchanger (20) of this variant, as shown in FIG. 9, one column part may be formed for each pair of tube columns. Specifically, in this adsorption heat exchanger (20), a first column part (21) is constituted by a part of the adsorption heat exchanger (20) extending from the front edge to the middle between the second tube column (42) and the third tube column (43), and a second column part (22) is constituted by a part of the adsorption heat exchanger (20) extending from the middle between the second tube column (42) and the third tube column (43) to the rear edge.

In other words, the adsorption heat exchanger (20) has the first column part (21) and the second column part (22) formed in order from upstream to downstream in air flow (from left to right in FIG. 9). In this adsorption heat exchanger (20), the first column part (21) provides an upstream part (26) and the second column part (22) provides a downstream part (27).

In the adsorption heat exchanger (20) shown in FIG. 9, each fin (30) has the first adsorption layer (36) formed on a region thereof located corresponding to the first column part (21) and the second adsorption layer (37) formed on a region thereof located corresponding to the second column part (22). Where this variant is applied to the adsorption heat exchanger (20) of Embodiment 1, the mass content of adsorbent in each adsorption layer (36, 37) increases in order of the first adsorption layer (36) and the second adsorption layer (37). Where this variant is applied to the adsorption heat exchanger (20) of Embodiment 2, the static capacity of adsorbent provided in each adsorption layer (36, 37) increases in order of the first adsorption layer (36) and the second adsorption layer (37).

INDUSTRIAL APPLICABILITY

As seen from the above description, the present invention is useful as an adsorption heat exchanger in which an adsorbent is carried on its fins.

The invention claimed is:

1. An adsorption heat exchanger including a heat exchange tube through which heat medium circulates and fins which are attached to the heat exchange tube and on the surfaces of which an adsorbent is carried, said adsorption heat exchanger for bringing air passing therethrough into contact with the adsorbent carried on the fins, wherein
    a part of said adsorption heat exchanger located upstream in air flow constitutes an upstream part and a part of said adsorption heat exchanger located downstream in the air flow constitutes a downstream part,
    an adsorption layer made of a mixture having a ratio of adsorbent and binder is formed on the surfaces of the fins,
    a thickness of the adsorption layer in the downstream part is substantially the same as that of the adsorption layer in the upstream part, and
    the downstream part has a mixture ratio having a higher mass content of adsorbent to binder in the adsorption layer than the mixture ratio of the upstream part.

* * * * *